United States Patent [19]
Ronda et al.

[11] Patent Number: 5,811,154
[45] Date of Patent: Sep. 22, 1998

[54] METHOD OF COATING A LUMINESCENT MATERIAL

[75] Inventors: Cornelis R. Ronda; Volker U. Weiler, both of Aachen; Annette Johnen, Langerwehe, all of Germany; Johannes A. F. Peek, San Pedro Garza Garcia, Mexico; Wilhelmus M. P. Van Kemenade, Asten, Netherlands

[73] Assignee: U.S. Philips Corporation, New York, N.Y.

[21] Appl. No.: 512,434

[22] Filed: Aug. 8, 1995

[30] Foreign Application Priority Data

Aug. 8, 1994 [EP] European Pat. Off. .............. 94202279

[51] Int. Cl.⁶ ...................................................... B05D 5/06
[52] U.S. Cl. ............................. 427/64; 427/215; 427/380
[58] Field of Search ................................ 427/64, 215, 380

[56] References Cited

U.S. PATENT DOCUMENTS

| | | | |
|---|---|---|---|
| 4,946,707 | 8/1990 | Kasenga et al. ........................... | 427/64 |
| 5,196,229 | 3/1993 | Chau ......................................... | 427/64 |
| 5,368,886 | 11/1994 | Tono et al. ............................... | 427/64 |
| 5,382,452 | 1/1995 | Bruno et al. ............................. | 427/64 |

FOREIGN PATENT DOCUMENTS

| | | |
|---|---|---|
| 0160856 | 11/1985 | European Pat. Off. . |
| 0479298 | 4/1992 | European Pat. Off. . |
| 0479299 | 4/1992 | European Pat. Off. . |
| 0488330 | 6/1992 | European Pat. Off. . |

*Primary Examiner*—Janyce Bell
*Attorney, Agent, or Firm*—Norman N. Spain

[57] ABSTRACT

The invention relates to a method of coating a luminescent material with a layer of a metal oxide $M_2O_3$ wherein a metal M is chosen from the group formed by Y and Al. The invention also relates to a coated luminescent material and to a low-pressure mercury discharge lamp.

According to the invention, the luminescent material is first introduced into a solution of a salt of the metal M, then a compound of the metal M is deposited on the luminescent material through homogeneous precipitation, and subsequently the luminescent material is separated from the solution, dried, and heated.

It is achieved thereby that the luminescent material will absorb mercury to a low degree only, and that accordingly the color point of a low-pressure mercury discharge lamp whose luminescent layer comprises a luminescent material coated in accordance with the invention only shows a small shift as the lamp ages.

3 Claims, 3 Drawing Sheets

○ BAM+Y2O3/900  + BAM+Aℓ2O3/1000
◇ BAM+Aℓ2O3/1050  ▽ BAM ref

○ BAM+Y2O3/900  + BAM+Aℓ2O3/1000
◇ BAM+Aℓ2O3/1050  ▽ BAM ref

η (lm/w)

|  | 0 | 25 | 100 | 1000 | 4000 |
|---|---|---|---|---|---|
| Al 50 | 70.55 | 66.89 | 66.75 | 65.64 | 65.11 |
| Al 25 | 69.95 | 66.59 | 66.39 | 64.92 | 64.23 |
| Y 50 | 69.82 | 66.93 | 66.64 | 65.59 | 65.36 |
| Y 25 | 70.33 | 66.47 | 66.51 | 65.45 | 64.57 |
| REF | 70.40 | 65.35 | 65.48 | 64.10 | 63.93 |

FIG. 5 dx

|  | 0 | 25 | 100 | 1000 | 3000 | 4000 |
|---|---|---|---|---|---|---|
| Al 50 | 0.0003 | −0.0005 | 0.0000 | 0.0021 | 0.0052 | 0.0046 |
| Al 25 | 0.0014 | 0.0004 | 0.0000 | 0.0022 | 0.0053 | 0.0054 |
| Y 50 | 0.0016 | 0.0003 | 0.0000 | 0.0008 | 0.0032 | 0.0028 |
| Y 25 | 0.0006 | 0.0001 | 0.0000 | 0.0012 | 0.0043 | 0.0038 |
| REF | −0.0005 | 0.0011 | 0.0000 | 0.0038 | 0.0078 | 0.0089 |

FIG. 6 dy

|  | 0 | 25 | 100 | 1000 | 3000 | 4000 |
|---|---|---|---|---|---|---|
| Al 50 | −0.0011 | −0.0008 | 0.0000 | 0.0021 | 0.0048 | 0.0044 |
| Al 25 | −0.0003 | 0.0000 | 0.0000 | 0.0032 | 0.0062 | 0.0060 |
| Y 50 | −0.0003 | −0.0004 | 0.0000 | 0.0014 | 0.0033 | 0.0032 |
| Y 25 | −0.0009 | −0.0008 | 0.0000 | 0.0015 | 0.0042 | 0.0042 |
| REF | −0.0024 | 0.0008 | 0.0000 | 0.0040 | 0.0079 | 0.0084 |

FIG. 7

METHOD OF COATING A LUMINESCENT MATERIAL

The invention relates to a method of coating a luminescent material with a layer of a metal oxide $M_2O_3$ in which a metal M is chosen from the group formed by Y and Al. The invention also relates to a coated luminescent material and to a low-pressure mercury discharge lamp.

A method as mentioned in the opening paragraph is known from European Patent EP 0 488 330. Small particles of the metal oxide and the luminescent material are brought together in an aqueous environment in the known method. After homogenization through stirring, the solid substance is separated from the liquid and dried. In the known method, the metal oxide/luminescent material ratio is so chosen that the metal oxide covers only a comparatively small portion of the surface area of the luminescent material. The use of the luminescent material obtained by the known method in a low-pressure mercury discharge lamp led to an improvement of the lumen maintenance of the low-pressure mercury discharge lamp compared with that of lamps in which uncoated luminescent materials are used. This improved maintenance is probably due to a less strong adhesion of HgO to the surface of a luminescent material coated with metal oxide. Besides adsorption of HgO at the surface of the luminescent material, adsorption and absorption of Hg also occurs in a low-pressure mercury discharge lamp. This absorption of Hg has a number of major disadvantages. First, Hg disappears from the plasma as the low-pressure mercury discharge lamp ages. This decrease in the quantity of Hg in the lamp plasma renders it necessary to introduce a comparatively large quantity of Hg into the lamp in the manufacture of the low-pressure mercury discharge lamp. The luminous efficacy of the low-pressure discharge lamp, however, is comparatively low with this comparatively great quantity of mercury. Other disadvantages of the mercury absorption are the fact that the optical properties of the luminescent material are changed thereby, while the presence of Hg also adversely affects the recycling possibilities of the luminescent material.

The invention has for its object to provide a method of coating a luminescent material with a metal oxide which leads to a product which has a comparatively low mercury absorption when used in a low-pressure discharge lamp.

According to the invention, a method as described in the opening paragraph is for this purpose characterized in that, in that order, the luminescent material is introduced into a solution of a salt of the metal M, a compound of the metal M is deposited on the luminescent material through homogeneous precipitation, the luminescent material is separated from the solution, is dried, and is heated.

It was found to be possible to provide luminescent materials with a closed or substantially closed crystalline, light-transmitting layer by a method according to the invention. The absorption of Hg by the luminescent material is considerably reduced thereby. It was also found that the metal oxide layers provided by a method according to the invention adhere well to the luminescent material, so that the luminescent material provided with a metal oxide layer allows itself to be applied to the wall of a lamp vessel satisfactorily by a known method employing a slurry.

In the case of a $Y_2O_3$ layer it was found that part of the Y atoms may be replaced (up to approximately 5%) by one or several rare earth metals. Thus it was found, for example, that a $Y_2O_3$ layer of which 5% of the Y atoms was replaced by europium is capable of achieving a similar reduction in the Hg absorption. The partial replacement of Y by one or several rare earth metals may be realised in that the Y salt used in the method according to the invention is mixed with a quantity of salts (soluble in the same solvent) of the relevant rare earth metals.

It is noted that European Patent EP 0 160 856 describes a method in which an $Al_2O_3$ layer is provided on a luminescent material by chemical vapour deposition. Chemical vapour deposition is a comparatively expensive process. In addition, layers provided by this method are indeed closed, but they are amorphous, so that the adhesion of the $Al_2O_3$ layer to the luminescent material is comparatively weak. As a result of this, for example, the layer may detach itself partly from the luminescent material when a slurry is formed with the product in this method in order to apply the product to the wall of a lamp vessel in this manner. It was found for the luminescent material $Zn_2SiO_4$:Mn coated with an $Al_2O_3$ layer that the emission properties of the luminescent layer changed when the layer was rendered crystalline through a heat treatment between 700° C. and 850° C. This change in the emission properties of the luminescent material was probably due to diffusion of Zn and Mn ions from the luminescent material into the $Al_2O_3$ layer, and of Al ions from the $Al_2O_3$ into the luminescent material. The change in the emission properties which occurs reduces the application possibilities in low-pressure mercury discharge lamps of the product obtained by the method described in EP 0 160 856.

It was found to be advantageous in the use of a method according to the invention to heat the luminescent material after drying first in air at a temperature of between 200° C. and 600° C., and then in a reducing atmosphere at a temperature of between 600° C. and 1200° C. Any organic ligands of the metal M are oxidized during heating in air. Heating at a higher temperature in a reducing atmosphere achieves the conversion of the layer from an amorphous to a crystalline, oxidic phase. The reducing atmosphere prevents any activators present in the luminescent material from being oxidized, which would lead to a change in the emission spectrum of the luminescent material. It was found that a maximum density of the layer can be achieved, when M=Y, in that heating in a reducing atmosphere is carried out at a temperature of between 850° C. and 950° C. When M=Al, a maximum layer density was found upon heating in a reducing atmosphere at a temperature of between 950° C. and 1100° C. These heat treatments did not cause any measurable diffusion of ions from the layer into the luminescent material, or of ions from the luminescent material into the layer, so that the emission properties of the luminescent materials were substantially unaffected.

The thickness of the layer formed by the metal oxide $M_2O_3$ is preferably chosen to lie within the range of 25 nm–100 nm. With comparatively thin layers, the Hg absorption further decreases as the layer becomes thicker. This is counterbalanced by the disadvantages of a thicker layer: higher cost and a longer time required for its manufacture.

The method according to the invention is highly suitable for coating barium-magnesium aluminate activated by bivalent europium, called BAM hereinafter. Among the luminescent materials used in the luminescent layers of low-pressure mercury discharge lamps with emission maxima in three spectral regions, BAM shows a comparatively high mercury absorption. As a result, the speed with which the quality of a luminescent layer comprising BAM in low-pressure mercury discharge lamps with emission maxima in three spectral regions deteriorates is largely determined by the speed with which BAM absorbs mercury. It was found that the quality deterioration of the luminescent layer of such a lamp may be considerably reduced in that from among the luminescent material forming part of the luminescent layer exclusively BAM is coated with a metal oxide layer.

BRIEF DESCRIPTION OF THE DRAWINGS

Embodiments of the invention will be explained with reference to a drawing.

In the drawing.

FIGS. 5 to 7 show a number of lamp properties as a function of the number of hours of operation of low-pressure mercury discharge lamps wherein the luminescent layers are formed by a mixture of phosphors comprising either BAM coated according to the invention or uncoated BAM, as a function of the number of hours of operation of these lamps and as a function of the layer thickness of the coating on the BAM.

Figure 1:
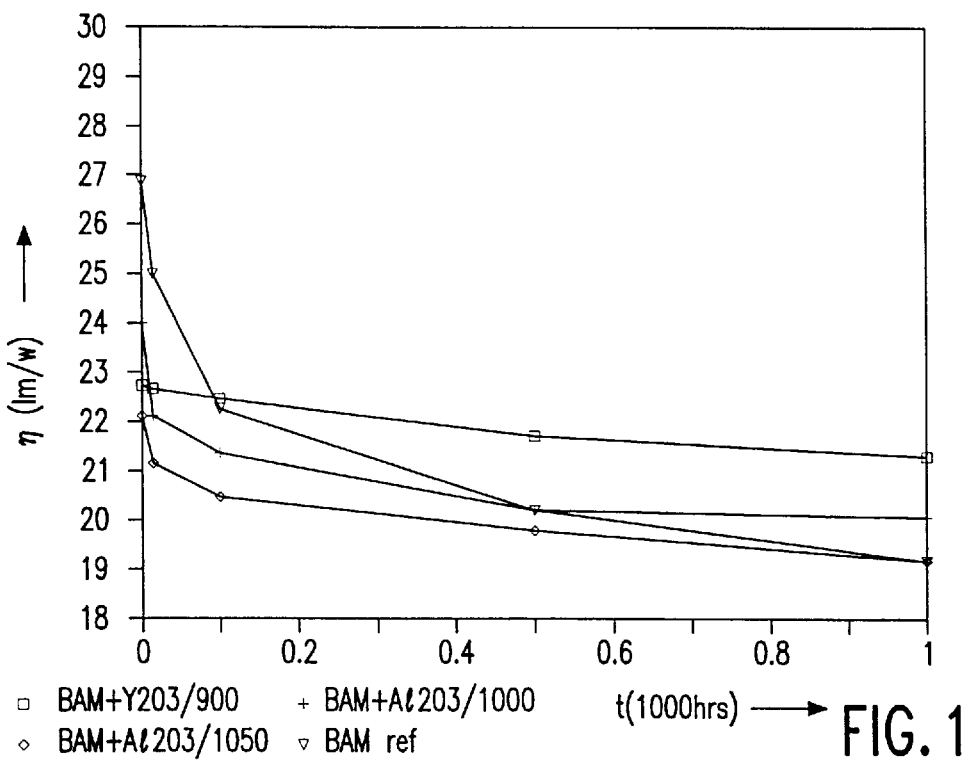
FIGS. 1 and 2 show the luminous efficacy and the mercury consumption of BAM coated according to the invention and of uncoated BAM as a function of the number of hours of operation of low-pressure mercury discharge lamps in which these phosphors were provided.

The low-pressure mercury discharge lamps to which the test results depicted in FIGS. 1 to 4 and FIGS. 5 to 7 relate are electrodeless low-pressure mercury discharge lamps with a power rating of approximately 85 W. These lamps were provided with an ionizable plasma containing mercury and argon and with a glass lamp vessel. A luminescent layer was provided on the lamp vessel wall. The data shown in FIGS. 1 to 4 relate to lamps whose luminescent layers contained only one luminescent material: BAM. These lamps can be subdivided into four types. Lamps of the first type had luminescent layers formed by phosphor particles coated with a $Y_2O_3$ layer of approximately 50 nm thickness heated in a reducing atmosphere at approximately 900° C. Lamps of this type are indicated with BAM+$Y_2O_3$/900 in the Figures. Lamps of the second and third type had luminescent layers formed by phosphor particles coated with an $Al_2O_3$ layer of approximately 50 nm thickness. For the second type, the $Al_2O_3$ layer was heated to 1000° C. after being provided, for the third type to 1050° C. Lamps of the second and third type are indicated in the Figures with BAM+$Al_2O_3$/1000 and BAM+$Al_2O_3$/1050, respectively. Lamps of the fourth type were provided with luminescent layers comprising uncoated BAM particles. These last lamps are indicated in the Figures with BAM ref.

The luminescent layers of the lamps to which the test results shown in FIGS. 5 to 7 relate comprised three luminescent materials: yttrium oxide activated by trivalent europium (YOX), cerium-magnesium aluminate activated by trivalent terbium (CAT) and BAM. The lamps differed from the lamps in the preceding paragraph as regards the composition of the luminescent layers only. Both uncoated and coated BAM particles were used for making the luminescent layers of these lamps. The coated BAM particles may further be subdivided into BAM particles coated with 25 nm $Al_2O_3$, BAM particles are coated with 50 nm $Al_2O_3$, BAM particles coated with 25 nm $Y_2O_3$, and BAM particles coated with 50 nm $Y_2O_3$. The lamps whose luminescent layers contained these BAM particles are indicated in the Tables with A125, A150, Y25, and Y50, respectively. The lamps whose luminescent layers contained uncoated BAM are indicated in the Tables with Ref. The BAM particles provided with an $Y_2O_3$ layer were heated in a reducing atmosphere to a temperature of approximately 900° C. The BAM particles provided with an $Al_2O_3$ layer were heated in a reducing atmosphere to a temperature of approximately 1040° C.

The above layers were provided as follows.

50 nm $Y_2O_3$ layer on BAM:

9.0 g $Y(NO_3)3.5H_2O$ and 75 g urea were dissolved in 350 ml deionized water. The solution was filtered through a 200 nm filter. The filtered solution was added to 50 g BAM in 1 l water, after which water was added until the total volume was approximately 1500 ml. The suspension was heated to 90° C. over half an hour and kept at this temperature until the pH value was approximately 7. After the suspension had cooled down to a temperature lower than 50° C. it was filtered. The filtrate was washed and dried overnight at 125° C. The particles thus obtained were heated in air at approximately 600° C. for 12 hours, after which a final heating step was carried out in a reducing atmosphere.

50 nm $Al_2O_3$ layer on BAM:

15.2 g $Al(NO_3)3.9H_2O$,7.4 g malonic acid, 16.7 g $NH_4Cl$, and 101.3 g urea were dissolved in 350 ml deionized water. The solution was filtered through a 200 nm filter. The pH was set for approximately 4–5 by means of diluted $NH_4OH$. This solution was added to 50 g BAM in 1 l water, after which water was added until the total volume was approximately 1500 ml. The suspension was heated to 90° C. over half an hour and then kept at this temperature for approximately 1.5 hour until the pH value was approximately equal to 7. After the suspension had cooled down to below 50° C. it was filtered. The filtrate was washed and dried overnight at 125° C. The particles thus obtained were heated in air at approximately 600° C. for 12 hours, after which a final heating step was carried out in a reducing atmosphere.

Layers with a layer thickness of approximately 25 nm were obtained in that the above preparation method was carried out with 100 g BAM instead of 50 g.

In the graphs of FIGS. 1 to 4, the number of hours of operation of the lamps is plotted on the horizontal axis in units of 1000 hours.

FIG. 1 shows on the vertical axis the luminous efficacy η of the lamps in 1 m/W. It can be seen that the lamps provided with BAM coated with $Y_2O_3$ have the lowest decrement in luminous efficacy during the first 1000 hours of operation. All lamps with coated BAM have a lower luminous efficacy than lamps with uncoated BAM at 0 hours. The decrement in the luminous efficacy, however, is much smaller for lamps with coated BAM, so that after approximately 1000 hours the luminous efficacy of lamps with coated BAM is higher than the luminous efficacy of lamps with uncoated BAM. With BAM coated with $Y_2O_3$, the luminous efficacy is higher than that of uncoated BAM after 100 hours already.

Figure 2:
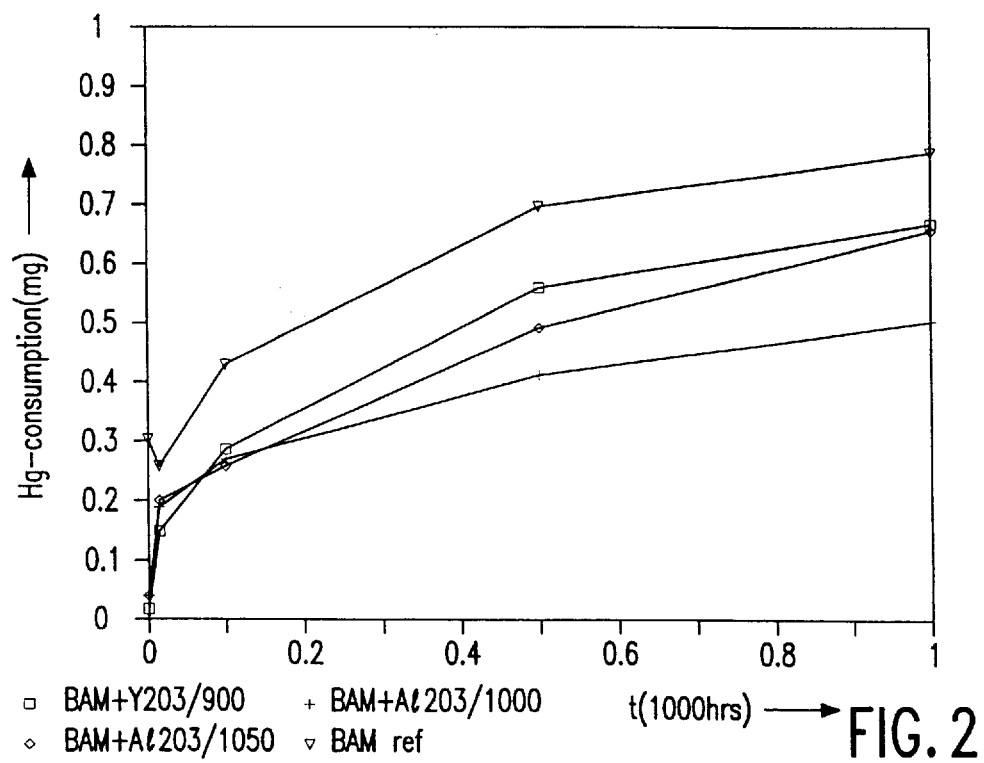

In FIG. 2, the Hg consumption of the lamps in mg is plotted on the vertical axis. Hg consumption is understood to mean the quantity of Hg absorbed by the luminescent layer. It is apparent that the Hg consumption in lamps with uncoated BAM is highest. The lowest Hg consumption was found in lamps of the second type. In a separate series of experiments, the Hg consumption of lamps provided with BAM coated with an $Y_2O_3$ layer of approximately 100 nm thickness was also investigated. It was found that Hg consumption after 1000 hours did not differ measurably from that of BAM provided with an $Y_2O_3$ layer of 50 nm thickness.

Figure 3:
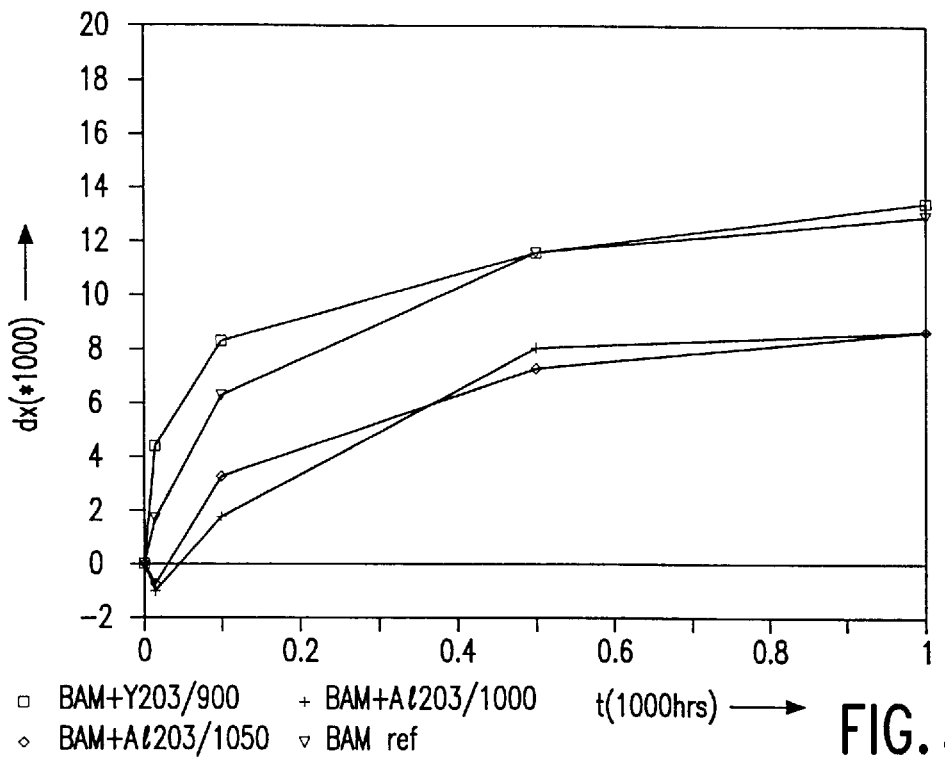
FIGS. 3 and 4 show the shift in the x-coordinate and y-coordinate, respectively, of the colour point of the light of these lamps as a function of the number of hours of operation.
Figure 4:
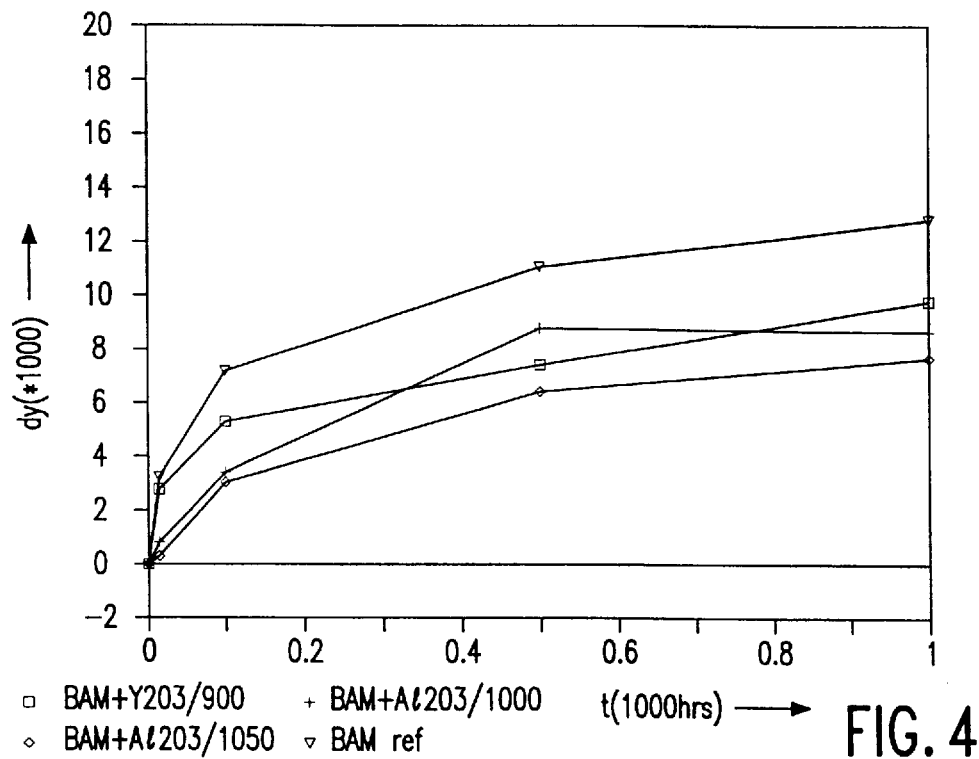

In FIG. 3, the shift dX of the x-coordinate of the colour point of the light radiated by the lamps is plotted on the vertical axis in units of 0.001. In FIG. 4, the shift dY of the y-coordinate of the colour point of the light radiated by the lamps is plotted on the vertical axis in units of 0.001. It is evident that the shift in the x-coordinate of the colour point after 500 hours, and also after 1000 hours of operation is approximately equal for lamps provided with $Y_2O_3$-coated BAM and for lamps with uncoated BAM. The lamps provided with $Al_2O_3$-coated BAM showed a substantially smaller shift. The shift dY of the y-coordinate was lower in all lamps provided with coated BAM than it was in lamps provided with uncoated BAM. The smallest shift in the y-coordinate was found in lamps of the third type.

FIG. 5 shows the luminous efficacy η in 1 m/W for lamps whose luminescent layers contained YOX, CAT, and BAM, at 0, 25, 100, 1000, and 4000 hours of operation. The luminous efficacy of the lamps whose luminescent layer contains coated BAM drops less strongly than does the luminous efficacy of lamps with uncoated BAM in the luminescent layer. A 50 nm thick layer on the BAM leads to a less strong decrement in the luminous efficacy than does a 25 nm thick layer, both in the case of $Y_2O_3$ and in the case of $Al_2O_3$. It could be concluded from results of further experiments, not shown in the Tables, that layer thicknesses greater than 50 nm, in the case of $Y_2O_3$, hardly achieved a smaller decrement in the luminous efficacy of the lamps.

FIG. 6 shows the shift dX of the x-coordinate of the colour point of each lamp for the same lamps as in FIG. 5, after 0, 25, 100, 1000, 3000, and 4000 hours of operation, relative to the colour point of the relevant lamp after 100 hours of operation.

FIG. 7 shows for the same lamps as in FIG. 5 the shift dY of the y-coordinate of the colour point of each lamp after 0, 25, 100, 1000, 3000, and 4000 hours of operation relative to the colour point of the same lamp after 100 hours of operation. It is apparent that the shift in the colour point can be substantially reduced through coating of the BAM forming part of the luminescent layer with $Al_2O_3$ or $Y_2O_3$.

We claim:

1. A method of coating a luminescent material with a crystalline layer of a metal oxide of the formula $M_2O_3$ where M is a metal selected from the group consisting of Y and Al, said method comprising: adding the luminescent material to a solution of a salt of the metal M, homogeneously precipating a compound of the metal M on the luminescent material, separating the luminescent material provided with the resultant precipitated compound from the solution, drying the separated luminescent material, heating the resultant dried luminescent material in air at temperature of between about 200° C. and 600° C. and then heating the luminescent material in a reducing atmosphere at a temperature between about 600° C. and 1200° C.

2. A method as claimed in claim 1, wherein M is Y, and wherein heating in a reducing atmosphere takes place at a temperature of between 850° C. and 950° C.

3. A method as claimed in claim 1, wherein M is Al, and wherein heating in a reducing atmosphere takes place at a temperature of between 950° C. and 1100° C.

* * * * *